June 14, 1955 S. GILBERT 2,710,763
QUICK DISCONNECT MOUNTING
Filed Feb. 24, 1951 2 Sheets-Sheet 1

INVENTOR.
SAMUEL GILBERT
BY
ATTORNEY

June 14, 1955　　　　S. GILBERT　　　　2,710,763
QUICK DISCONNECT MOUNTING
Filed Feb. 24, 1951　　　　　　　　　　2 Sheets-Sheet 2
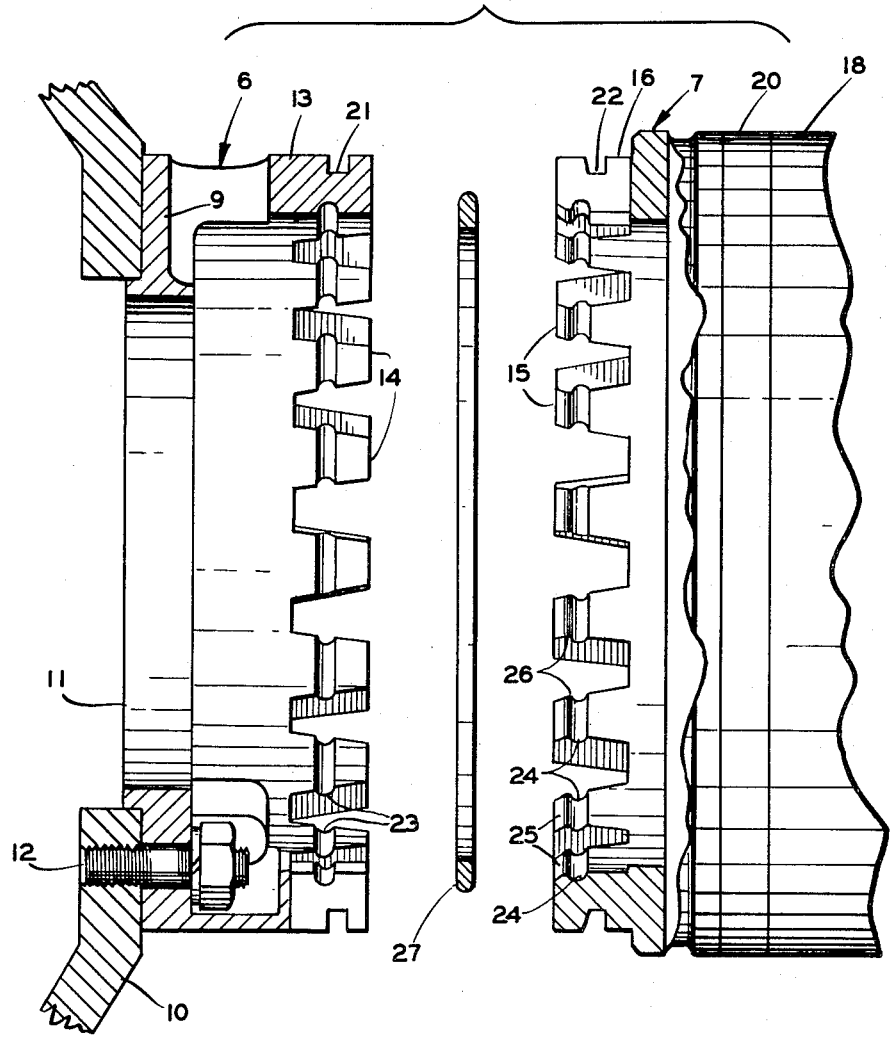
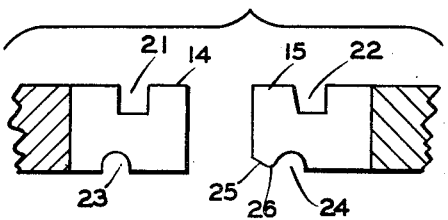
INVENTOR.
SAMUEL GILBERT
BY
ATTORNEY

United States Patent Office 2,710,763
Patented June 14, 1955

2,710,763

QUICK DISCONNECT MOUNTING

Samuel Gilbert, Cedar Grove, N. J., assignor to Bendix Aviation Corporation, Teterboro, N. J., a corporation of Delaware Application February 24, 1951, Serial No. 212,584

1 Claim. (Cl. 287—103)

The present invention relates to quick detachable means, such as mountings for accessories, and particularly to such means for mounting aircraft engine accessories.

Aircraft engines may have several parts detachable therefrom, such as an engine starter, generator, fuel pump, supercharger to mention a few, and adapted to be drivably connected to the engine. In service, it is desirable that the accessories may be individually and rapidly replaceable. Thus, it is desirable to have some means to provide for a quick detachable mounting so that, upon failure of one accessory, the craft may not be incapacitated for an undue length of time.

By reasons of the high frequency vibrations of the engine, temperature changes, lack of space, inaccessibility cost, impracticability of employing heavy material, and other factors, the provision of a rapid detachable accessory mount, which is suitable in all applications and does not fail in one respect or another, has presented difficult problems.

One feature that is desirable is that the accessory be self-supporting when placed in position in the mounting before the clamping rings are secured in place.

The present invention provides means for supporting the accessory when placed in position in the mounting and is an improvement of the mounting means illustrated and claimed in copending application for U. S. Patent Serial No. 29,182, filed May 25, 1948 by Henry Troeger, now U. S. Patent No. 2,553,220.

An object of the present invention is to provide improved quick disconnect mounting means for engine accessories.

Another object of the invention is to provide novel means for supporting an engine accessory in a quick disconnect mounting.

Another object of the invention is to provide a quick detachable mounting in which the accessory is self-supporting.

The above and other objects and features of the invention will appear more fully hereinafter from a consideration of the following description taken in connection with the accompanying drawings wherein one embodiment of the invention is illustrated by way of example.

In the drawings:

Figure 2 is a cross-section view illustrating the details of the mounting.

Figure 3 is an enlarged fragmentary detail section illustrating the tooth structure.

Figure 1:
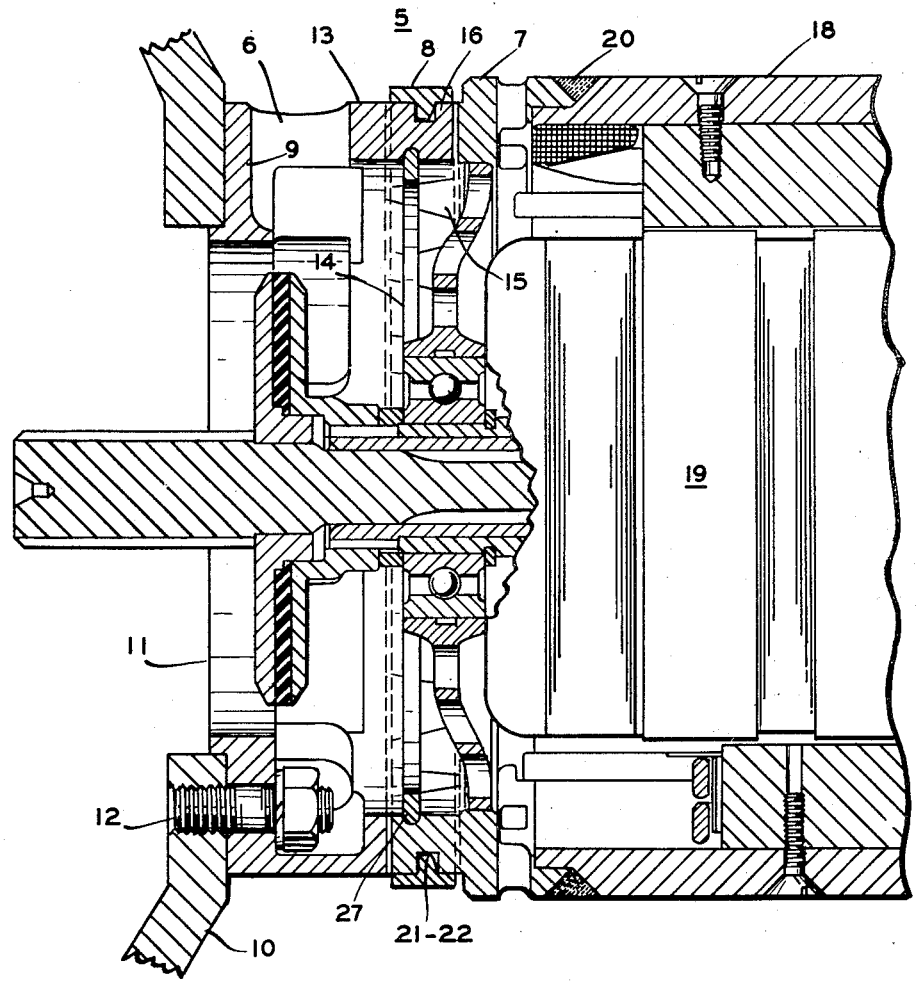
Figure 1 is a cross-section view of an accessory mounted on an engine casing illustrating a preferred embodiment of the invention.

Referring now to the drawings, a quick detachable engine accessory mount indicated generally by the numeral 5 comprises an engine adaptor member 6, an accessory adaptor member 7 and a clamp ring 8.

The member 6 has a circumferential flange 9 adapted to be secured to an engine casing 10 around an opening 11 therein by studs 12. The opposite end of the member 6 has an outward extending circumferential flange member 13 having axial wedge-like elements or teeth 14 around the axis thereof. The teeth 14 are adapted to mesh with teeth 15 around the axis of circumferential flange member 16 of the member 7. The member 7 is secured to housing 18 of an accessory, indicated generally by the numeral 19, by any suitable method, such as by a weld 20 as illustrated. It is understood, however, that the member 7 may be attached to the housing 18 by any conventional method or may be made integral with the housing 18.

The teeth 14 and 15 have lateral recesses or channels 21 and 22, respectively, on the outer circumference for substantial register when the teeth 14 and 15 are in the meshed position. The resilient ring-like element or split ring 8 is adapted for positioning in the channels 21 and 22 to secure the members 6 and 7 together. Details of the tooth construction and clamping ring are described and claimed in the copending application Serial No. 29,182.

The novel feature of the present invention is directed to the means for supporting the accessory 19 before the clamping ring 8 is secured in the clamping position. A circumferential groove 23 is provided on the inner circumference of the teeth 14. A corresponding groove 24 is provided on the inner circumference of the teeth 15 and is adapted, when the teeth 14 and 15 are in mesh, for register with the groove 23 to form a continuous groove around the inner circumference of the teeth 14 and 15. The outer edges of the teeth 15 have a chamfer 25 and radius 26 to cut off a portion of the teeth 15 so that the outer walls of the grooves 24 do not extend for the full depth of the grooves.

A resilient split ring 27 having a free diameter slightly greater than the inner diameter of the grooves 23 and 24 is adapted for compression in the grooves 23 and 24.

In operation, the ring 27 is placed in the grooves 23 and is held in position in the grooves 23 by the outward biased resiliency of the ring. The accessory 19 is positioned so that the teeth 14 and 15 will mesh and is then moved toward that adaptor member 6. The chamfer 25 forces the ring 27 to contract sufficiently to pass over the radius 26 and snap into the grooves 24 as they are aligned with the grooves 23. The ring 27 has sufficient bias to hold the teeth 14 and 15 in mesh and supports the accessory until the clamp ring 8 can be secured in position.

To remove the accessory, the clamp ring 8 is first removed, then force is applied to the accessory 19 in a direction away from the mounting 6. The radius 26 and chamfer 25 of the teeth 15 permit the ring 27 to pull out of the grooves 24 and the members 6 and 7 to be separated. By the outer walls of the grooves 23 being greater than that of the grooves 24, the ring 27 is retained in the grooves 23.

The aforenoted arrangement facilitates the attaching and detaching of accessories in that the accessory is self-supported in the mount by the snap ring thus eliminating the necessity of manually holding the accessory in position while the clamp ring is installed or removed.

While the groove with the chamfer and radius is shown on the accessory unit, it is understood that it could be on the engine adapter member.

Although only one embodiment of the invention has been illustrated and described, various changes in the form and relative arrangement of the parts, which will now appear to those skilled in the art, may be made without departing from the scope of the invention.

What is claimed is:

In a quick-detachable accessory mount, cylindric base and accessory members having adjacent-end wedge-like teeth for ready axial wedge meshing with each other, said teeth having lateral channels in the outer circumference thereof to form an annular groove adapted to receive a first ring-like resilient element spring biased into the groove for locking the members axially together, said teeth having lateral channels in the inner circumference thereof to form an annular groove adapted to receive a second ring-like resilient element spring biased into the groove for holding the members axially together, the lateral channels in the inner circumference of the teeth of one of said members having walls at adjacent ends of the teeth of said one member with a chamfer surface, and the lateral channels in the inner circumference of the teeth of the other of said members having walls at adjacent ends of said teeth of greater depth than the walls at the adjacent ends of the teeth of said one member so that said second ring-like element is retained in the lateral channels in the inner circumference of the teeth of said other member upon separation of the teeth of said one member from meshing relation with the teeth of the other of said members.

References Cited in the file of this patent

UNITED STATES PATENTS

| | | |
|---|---|---|
| 738,503 | Waters | Sept. 8, 1903 |
| 2,471,182 | Worth | May 29, 1949 |
| 2,553,220 | Troeger | May 15, 1951 |